June 5, 1951  R. G. GULICK  2,555,335
TERRACING MACHINE
Filed Sept. 8, 1947  4 Sheets-Sheet 4
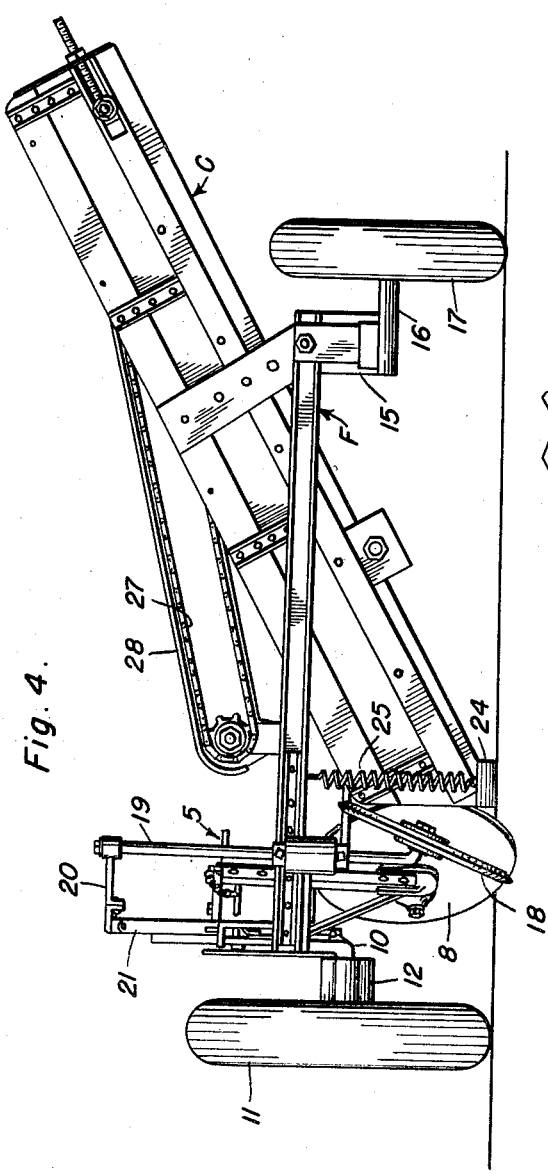
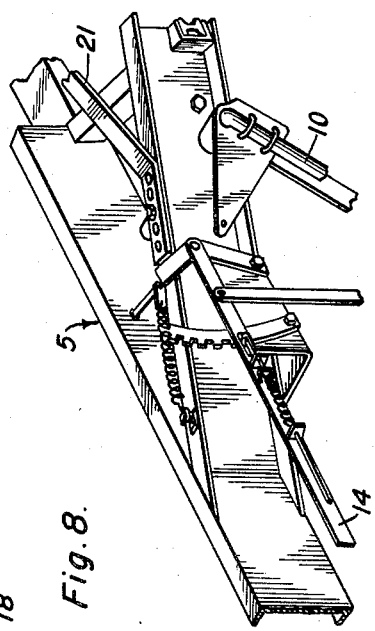
Inventor
Russell G. Gulick
By *Clarence A. O'Brien and Harvey B. Jacobson*
Attorneys Patented June 5, 1951

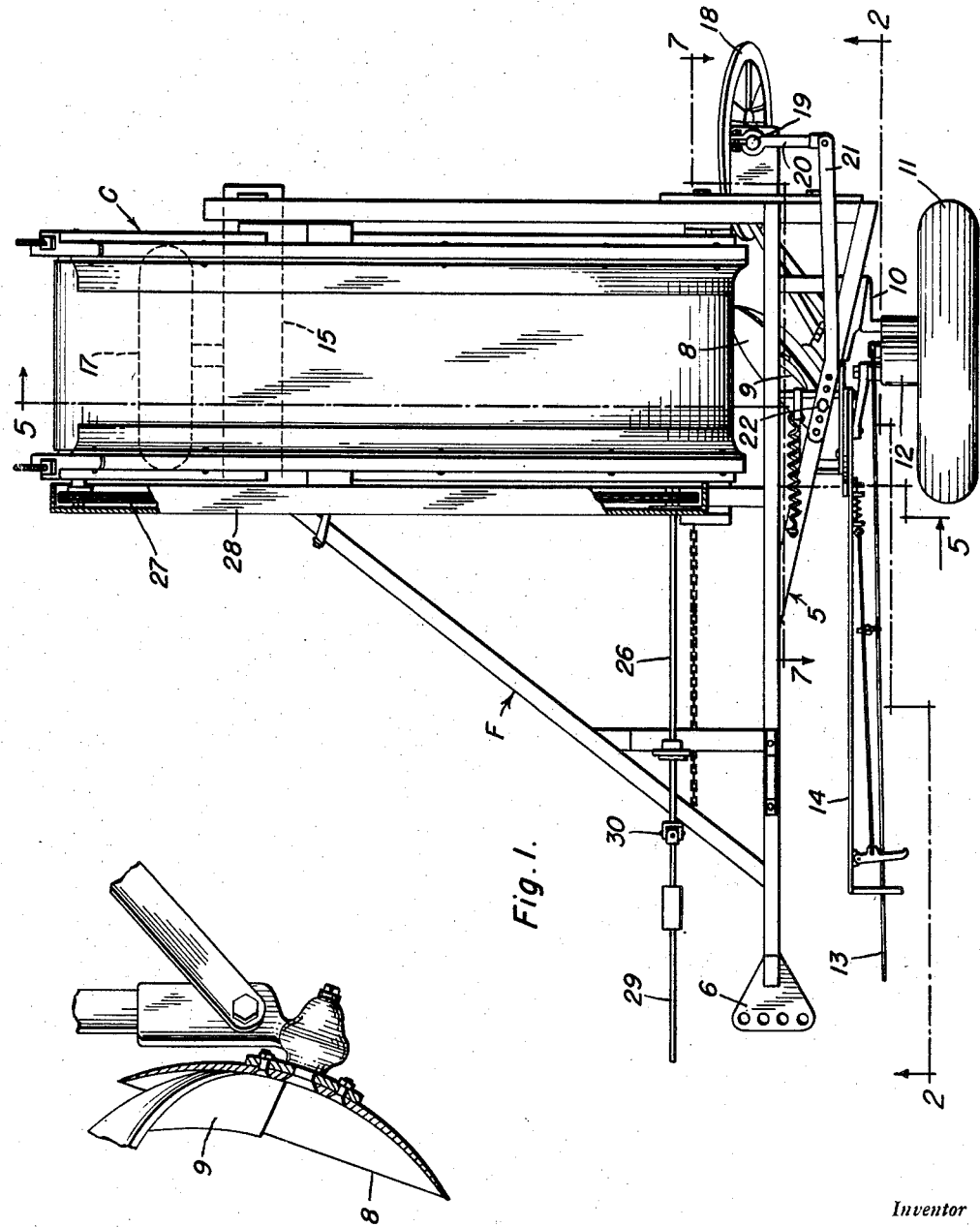

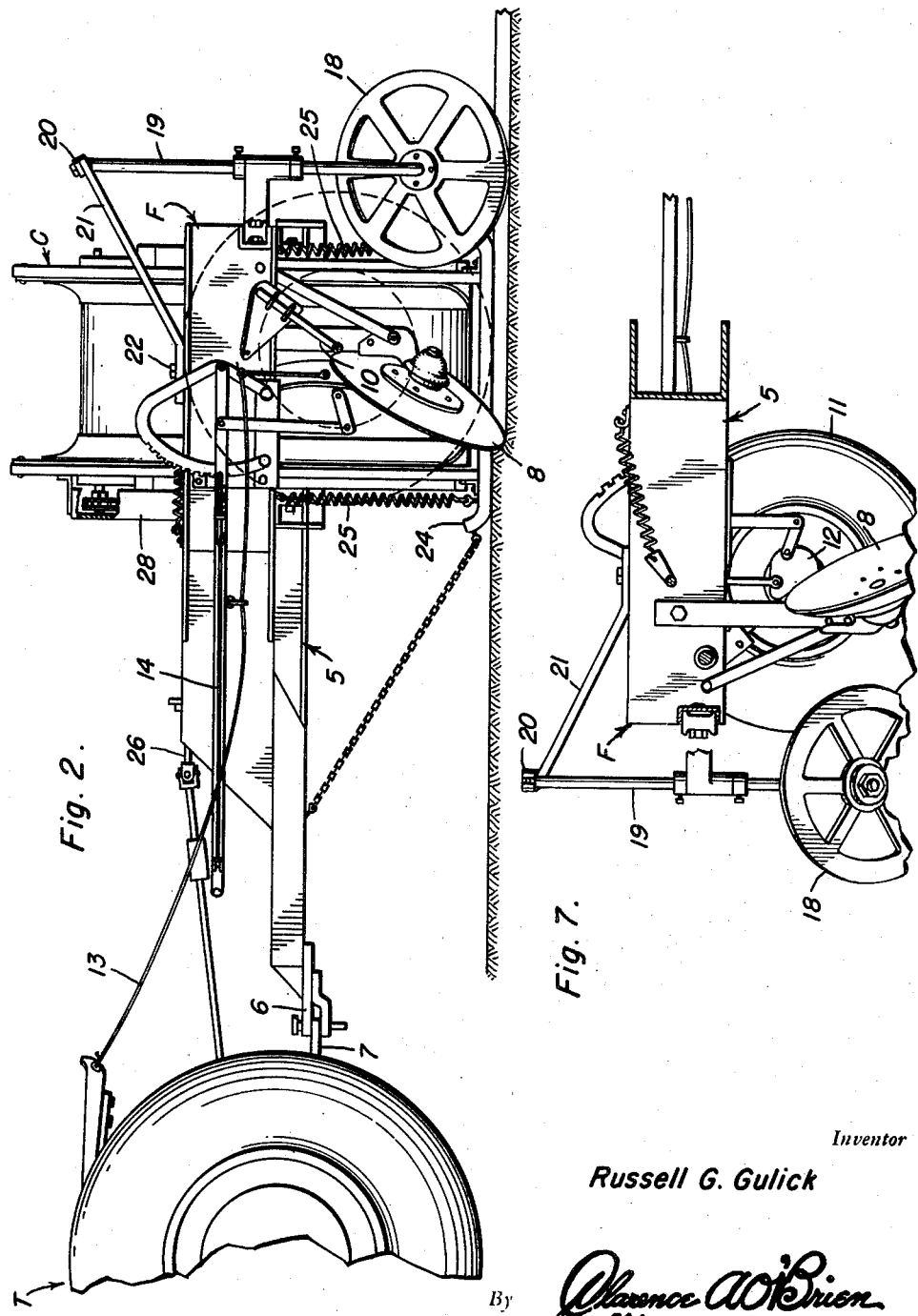

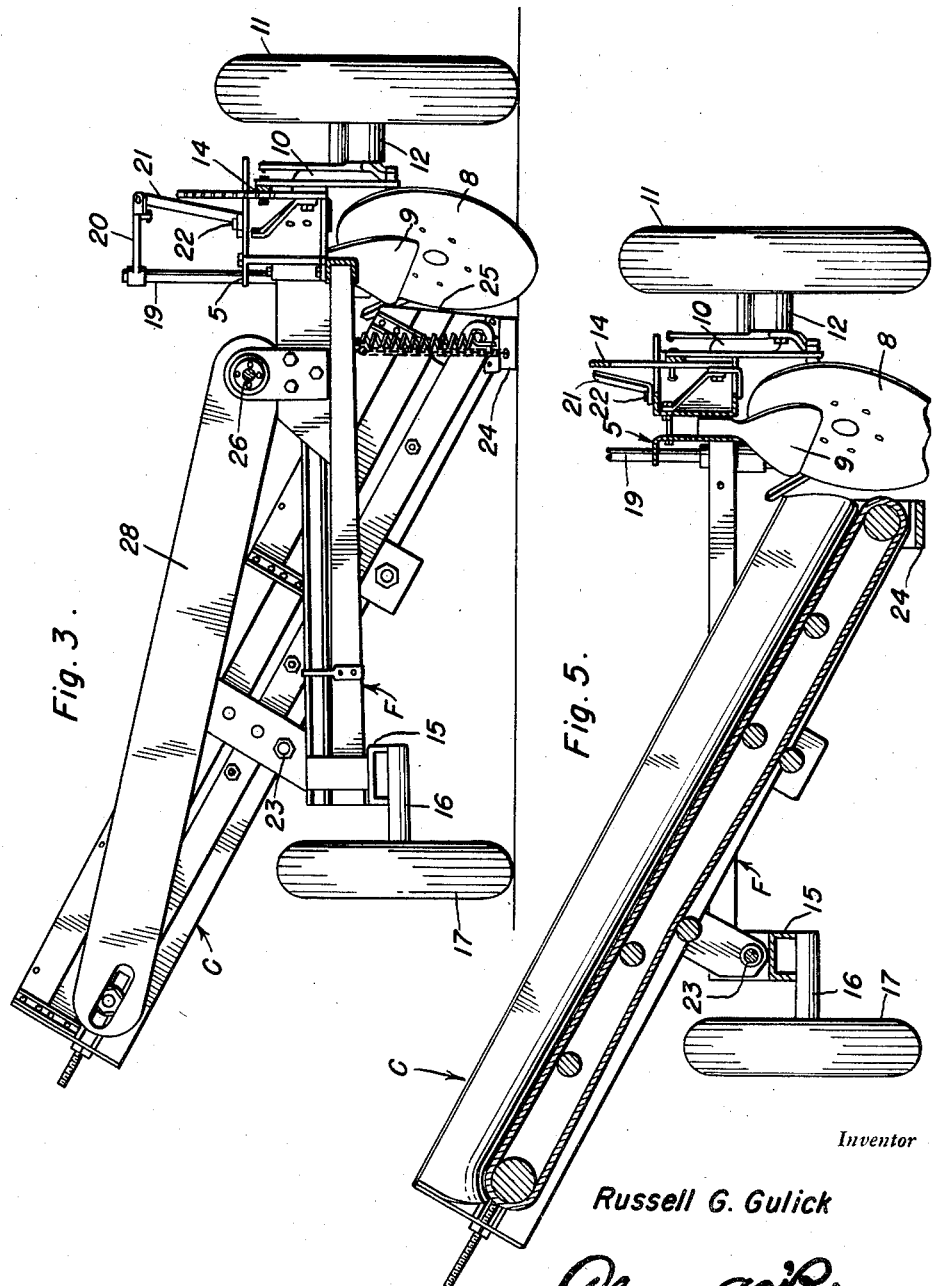

2,555,335

UNITED STATES PATENT OFFICE 2,555,335

TERRACING MACHINE

Russell G. Gulick, Grenola, Kans.

Application September 8, 1947, Serial No. 772,768

1 Claim. (Cl. 37—110)

1

For the purpose of soil conservation, it has become the practice to terrace farm land, and the primary object of this invention is to provide a simple and efficient machine for performing the terracing operation.

The present machine is of a type generally similar to an elevating grader and is adapted to be towed by a tractor. It includes a conveyor adapted to be driven from the power take-off shaft of the tractor, a plow disc adapted to form a furrow and deliver the furrow slice onto the inclined transverse conveyor at one side of the machine, the conveyor being arranged to carry the earth to and deposit it onto the ground at the opposite side of the machine to build the terrace.

A specific object of the invention is to utilize conventional devices, such as are ordinarily used in the construction of disc plows, for lifting or lowering the plow disc of the machine, and for raising or lowering a side of the frame of the machine with reference to the axis of a land wheel located at such side of the frame and adjacent the plow disc.

Another object is to mount the conveyor so that it may yield vertically whereby the lower end of the conveyor will ride over obstructions and irregularities of the ground surface to avoid damage to the machine in use.

More specific objects and features of the invention will become apparent from the following description when considered in connection with the accompanying drawings, in which:

Figure 1 is a top plan view, partly broken away and in section of a terracing machine constructed in accordance with the present invention;

Figure 2 is a view of the machine shown in Figure 1, partly in side elevation and partly in section on line 2—2 of Figure 1, the machine being shown as coupled to a tractor;

Figure 3 is a view of the machine shown in Figure 1, partly in front elevation and partly in section;

Figure 4 is a rear elevational view of the machine;

Figure 5 is a transverse section taken on line 5—5 of Figure 1;

Figure 6 is an enlarged fragmentary perspective view showing the rear portion of the plow beam and adjacent parts;

Figure 7 is a fragmentary section taken on line 7—7 of Figure 1; and

Figure 8 is a fragmentary perspective view showing a portion of the plow beam and adjacent parts.

2

Referring in detail to the drawings, the machine includes an open frame F which is preferably of substantially trapezoidal form and whose longer parallel side member comprises a plow beam 5 having a projecting forward end portion provided with means 6 to facilitate coupling thereof to the drawbar 7 of a tractor T. The beam 5 is equipped with a plow disc 8 having a scraper 9 located near it for scraping the disk, the scraper being suitably carried by the beam 5. It also has one end of a crank axle 10 journaled therein, and a land wheel 11 is journaled on the other end of said crank axle and disposed at the outer side of the plow disc 8. Associated with the crank axle 10 and land wheel 11 is a conventional implement lift mechanism 12 which includes a clutch adapted to be operated by a pull on a cord 13 from the driver's seat of the tractor so that the land wheel 11 will provide power for lifting the plow disc 8 above the ground. Conventional means including a hand lever 14 is also provided for raising and lowering the adjacent side of the frame with reference to the axis of the land wheel 11. These conventional devices are of the type shown, for example, in the U. S. patents to J. V. Holstein, No. 1,627,902, May 10, 1927; and to H. S. Smith, No. 1,643,644, September 27, 1927.

The shorter parallel side member 15 of the trapezoidal frame is offset downwardly and has fixed thereto a stub axle 16 on which is journaled, substantially in transverse alignment with land wheel 11, a smaller carrier wheel 17. Mounted on the back of the frame directly behind the plow disc 8 is a vertically adjustable furrow wheel 18 adapted to run in the furrow made by the plow disc and to thereby keep the machine in line with the tractor. The furrow wheel is journaled on the lower end of a rotatable vertical post 19 having a crank arm 20 fixed on its upper end, and a link 21 is pivoted at one end to the crank arm 20 and adjustably secured at its other end to the frame 5 as at 22 for adjusting the angle of said furrow wheel to the line of draft to meet varying tendencies of the machine to drift laterally.

An inclined endless conveyor C is disposed transversely of the frame and is pivoted between its ends at 23 upon the shorter side frame member 15 for vertical swinging movement. This conveyor extends downwardly through the frame to a point adjacent the ground and directly at the inner side of plow disc 8. At its lower end, the conveyor carries a shoe or runner 24, and tension springs 25 connect this shoe with the frame so as to yieldingly suspend the lower end of the conveyor with the shoe disposed a slight distance above the ground. Thus, the lower end of the conveyor may yield vertically to allow the shoe 24 to ride over obstructions and irregularities in the ground surface and thereby avoid damage to the conveyor. The plow disc and scraper are obliquely disposed so as to turn a furrow slice and direct it laterally onto the lower end of the conveyor as the machine is drawn ahead. The conveyor carries the earth upwardly and laterally past the opposite side of the frame and discharges such earth onto the ground at the side of the machine remote to the plow disc and land wheel to build the terrace.

A shaft section 26 is journaled on the frame F in front of the conveyor C, and the rear end of this shaft section is operatively connected with the head shaft of conveyor C by means of a chain gearing 27 having a chain guard 28 associated therewith. Another longitudinal shaft section 29 is connected with the forward end of shaft section 26 by means of a universal joint 30, and said shaft section 29 is suitably adapted to be connected at its forward end with the power takeoff shaft of the tractor so that when said power takeoff shaft is driven, the endless conveying element of conveyor C will be driven through the shafts 29 and 26 and gearing 27.

From the foregoing description, it is believed that the construction, operation and advantages of the present invention will be readily understood and appreciated by those skilled in the art. Modifications and changes in details of construction are contemplated, such as fall within the scope of the invention as claimed.

Having described the invention, what is claimed as new is:

In a terracing machine, an open frame, one side member of which comprises a plow beam having a projecting forward end portion provided with means to facilitate coupling thereof to the rear drawbar of a tractor, said beam being equipped with a plow disk and having a crank axle journaled therein, a land wheel journaled on said crank axle and disposed at the outer side of the plow disk, an implement lift mechanism operatively connected with the crank axle and land wheel and including a clutch operable from the driver's seat of the tractor so that the land wheel will provide power for lifting the plow disk, means including a hand lever for raising and lowering the adjacent side of the frame with reference to the axis of the land wheel, a vertically adjustable furrow wheel mounted at the back of the frame directly behind the plow disk, a rotatable vertical post having the furrow wheel journaled on the lower end thereof, a crank arm fixed on the upper end of said post, and a link pivoted at one end to the crank arm and adjustably secured at its other end to the beam for adjusting the angle of said furrow wheel to the line of draft.

RUSSELL G. GULICK.

REFERENCES CITED

The following references are of record in the file of this patent:

UNITED STATES PATENTS

| Number | Name | Date |
|---|---|---|
| 1,643,644 | Smith | Sept. 27, 1927 |
| 2,089,319 | Wooley | Aug. 10, 1937 |
| 2,248,709 | Jarmin | July 8, 1941 |